United States Patent [19]
Kobayashi

[11] 4,198,117
[45] Apr. 15, 1980

[54] OPTICAL WAVELENGTH-DIVISION MULTIPLEXING AND DEMULTIPLEXING DEVICE

[75] Inventor: Kohroh Kobayashi, Tokyo, Japan

[73] Assignee: Nippon Electric Co., Ltd., Tokyo, Japan

[21] Appl. No.: 865,205

[22] Filed: Dec. 28, 1977

[30] Foreign Application Priority Data

Dec. 28, 1976 [JP] Japan .................. 51-158515
Jul. 7, 1977 [JP] Japan .................. 52-81736

[51] Int. Cl.² .............................................. G02B 5/14
[52] U.S. Cl. .............................................. 350/96.19
[58] Field of Search ............... 350/96.19, 96.18, 96.16

[56] References Cited
U.S. PATENT DOCUMENTS

| | | | |
|---|---|---|---|
| 3,937,557 | 2/1976 | Milton | 350/96.18 |
| 3,975,082 | 8/1976 | Winzer | 350/96.19 |
| 4,057,319 | 11/1977 | Ash et al. | 350/96.19 |
| 4,067,642 | 1/1978 | King et al. | 350/96.19 |
| 4,077,701 | 3/1978 | Steensma et al. | 350/96.19 |
| 4,111,524 | 9/1978 | Tomlinson | 350/96.19 |

*Primary Examiner*—Stewart J. Levy
*Attorney, Agent, or Firm*—Hopgood, Calimafde, Kalil, Blaustein & Lieberman

[57] ABSTRACT

An optical multiplexer-demultiplexer consisting essentially of a light-focusing transmission body having a radially graded refractive index distribution and a reflection or transmission type diffraction grating. The transmission body is given an axial length approximately equal to an integral multiple of one quarter of the pitch of undulation of an off-axis input light beam as travelling through the transmission body while the diffraction grating is arranged on the axis of the transmission body at a distance approximately equal to an odd multiple of one quarter of the pitch of beam undulation from one end face of the transmission body which is normal to the axis. A composite light beam directed into the transmission body is dispersed by the diffraction grating into wavelength components, which are separately focused to be extracted as through respective optical fibers. The device needs no separate optical elements such as reflecting mirrors or an independent diffraction grating and is not only particularly compact in size and stable on account of its integral structure but is capable of a high degree of multiplexing.

6 Claims, 6 Drawing Figures

OPTICAL WAVELENGTH-DIVISION MULTIPLEXING AND DEMULTIPLEXING DEVICE

BACKGROUND OF THE INVENTION

This invention relates to circuit elements usable in optical transmission systems and more particularly to optical wavelength-division multiplexing and demultiplexing devices which are designed to multiplex a plurality of light beams differing from each other in wavelength and demultiplex a light beam including different-wavelength components into beams of respective wavelengths.

As optical fibers, semiconductor lasers and the like are improved in quality and performance, optical-fiber transmission systems are now arousing great interest as promising transmission means in the future and being developed rapidly for practical application. As circuit elements particularly important in forming practical optical-fiber communication systems, optical multiplexing or demultiplexing devices have been required which are designed to couple a plurality of light beams with a single optical fiber or to divide a light beam into a plurality of light beams. Optical multiplexing may be effected in different ways but, among others, the wavelength-division multiplexing technique is suitable for common optical-fiber communications, which employs a plurality of light beams differing from each other in wavelength. For optical wavelength-division multiplexing, it has previously been proposed to direct a plurality of light beams all into a single transmission line by means of a reflecting mirror having a wavelength selectivity or to separate a light beam transmitted through a single transmission channel into beams of respective wavelengths.

Such technique is disclosed in a paper entitled "Optical Waveguide Technology for Modern Urban Communications", by R. L. Gallawa, pp. 131-142, IEEE Transactions on Communications, Vol. COM-23, No. 1, January 1975. The technique, however, is disadvantageous in that it is limited in density of multiplexing or number of transmission channels available on account of the fact that the interchannel wavelength spacing cannot be narrowed as desired since any reflecting mirror whose reflecting power is highly wavelength-dependent is hardly obtainable and that the arrangement of the reflecting mirror in the path of light beam involves an increase in insertion loss. Another disadvantage of this technique is that the structure including the reflecting mirror is rather complicated, lacking stability for any extended period of service.

In an alternative technique previously proposed for optical multiplexing or demultiplexing, use is made of an independent light dispersing element such as a prism or a diffraction grating, as is disclosed, for example, in a paper entitled "Optical Demultiplexing Device Using Prism", by S. Hata, p. 289, Proceedings of the 1976 National Convention of the Institute of Electronics and Communication Engineers of Japan. By this techniques, however, any compact and stable optical wavelength-division multiplexing and demultiplexing device can hardly be realized since such light-dispersing element is relatively large-sized and its optical as well as structural alignment with optical fibers can hardly be ensured.

SUMMARY OF THE INVENTION

It is accordingly a primary object of the present invention to provide an optical wavelength-division multiplexing and demultiplexing device which is capable of a high density of multiplexing, compact in size and highly stable.

According to the present invention, there is provided an optical wavelength-division multiplexing and demultiplexing device which is characterized in that it comprises a light-focusing transmission body having a refractive index graded to decrease in a cross section normal to the axis of the transmission body and having an axial length approximately equal to an integral multiple of one quarter of a predetermined pitch of beam undulation in the transmission body, and diffraction grating means formed on the axis of the transmission body at a distance approximately equal to an odd multiple of one quarter of the pitch of beam undulation from one end face of the transmission body which is normal to the body axis.

The optical wavelength-division multiplexing and demultiplexing device of the present invention can be made extremely compact in size and highly stable since the single light-focusing transmission body, which is extremely limited in size and with which input and output means such as optical fibers are associated, is effective by itself to vary the diameter and directional angle of input and output light beams during their passage through the transmission body. In addition, use of the optical multiplexing and demultiplexing device of the present invention makes it possible to realize an optical communication system exceedingly high in density of multiplexing as it employs a diffraction grating as a light-dispersing element.

In the device of the present invention, wavelength-division multiplexing or demultiplexing is effected by diffraction grating means and, to this end, the lens effect of the light-focusing transmission body and the planarity of its end faces are effectively utilized. Specifically, when a light beam is directed into the light-focusing transmission body of the device through an optical fiber which is led to the input end face of the transmission body, the diameter of the light beam changes as it proceeds through the transmission body and, with the diffraction grating arranged on the axis of the transmission body at a location where the beam diameter reaches its maximum, the light beam is diffracted to disperse at different angles in accordance with the wavelengths of the respective beam components. The diffracted beam components, proceeding further through the light-focusing transmission body, are again focused or reduced in diameter to a minimum at a location where output optical fibers are arranged so that the beam components are launched individually through the respective optical fibers. In this manner, with the device of the present invention, a light beam can be effectively wavelength-divided. It will be readily understood that, in accordance with the principle of reciprocity of light, the device of the present invention can also be employed as an optical multiplexing unit.

Description will next be made of the light-focusing transmission body usable in the present invention.

As disclosed in the article entitled "Optical Characteristics of a Light-Focusing Fiber Guide and its Applications", by Uchida et al, pp. 606-612, IEEE Journal of Quantum Electronics, Vol. QE-6, No. 10, October 1970, a light-focusing transmission body as referred to herein is a transparent body having a refractive index graded to decrease in a transverse cross section radially from the center to the periphery thereof. That is, the refractive index n(r) at a point of radius r from the center is expressed as $$n(r) = N_o(1 - \tfrac{1}{2}ar^2) \ldots \quad (1)$$

where $N_o$ is the refractive index on the axis of the transmission body and a is the focusing parameter thereof.

With such light-focusing transmission body, a light beam entering it through one of its end faces at an off-axis point thereon travels through the body, undulating with a period determined by the refractive index distribution of the transmission body. The pitch of undulation, P, that is, the distance of beam locus measured along the axis of the transmission body between two successive points at which the light obtains the same positional and angular deviations relative to the axis of the transmission body, is expressed as $$P = 2\pi/\sqrt{a} \ldots \quad (2)$$

Also, the light beam proceeding through the transmission body varies periodically in diameter at intervals of half the pitch of beam undulation. In this manner, the light-focusing transmission body has a kind of lens effect which is independent from the shape of the end faces of the transmission body and can exhibit such lens effect as described above even with its end faces made flat.

Generally, a light ray entering such light-focusing transmission body, of length l, through its input end face normal to the axis thereof, with a given positional deviation $x_1$ and a given angular deviation $x'_1$, travels through the transmission body to leave it at its output end face in the same meridian plane with positional deviation $x_2$ and an angular deviation $x'_2$ relative to the axis of the transmission body which are expressed by the following formulae:

$$x_2 = x_1 \cos\sqrt{a}l + x'_1/n_o\sqrt{a} \sin\sqrt{a}l \ldots \quad (3)$$

$$x_2' = -x_1 N_o\sqrt{a} \sin\sqrt{a}l + x_1' \cos\sqrt{a}l \ldots \quad (4)$$

Supposing that the light ray has no angular deviation at the input end face of the transmission body or enters it at right angles to the end face, formulae (3) and (4) are simplified as follows, respectively, for $x_1' = 0$:

$$x_2 = x_1 \cos\sqrt{a}l \ldots \quad (5)$$

$$x_2' = -x_1 N_o\sqrt{a} \sin\sqrt{a}l \ldots \quad (6)$$

In this instance, if the length l of the light-focusing transmission body is taken to satisfy an equation $\sqrt{a}l = \pi/2 + m\pi$ (m is an integer) or to be equal to an odd multiple of one quarter of the pitch of beam undulation P, $$x_2 = 0 \ldots \quad (7)$$

$$x_2' = -N_o\sqrt{a} \cdot x_1 \ldots \quad (8)$$

are obtained, Therefore, if a light beam is directed to enter such light-focusing transmission body at an off-axis point on one of the opposite end faces thereof, which are normal to the axis of the transmission body, and a right angles to the end face, there is obtained an output light beam which leaves the transmission body at the center of the other end face thereof in a direction inclined to the body axis. In view of the reciprocity of light, it will be apparent that, with such light-focusing transmission body having an axial length determined as described above, if a light beam is directed to enter the transmission body at the center of one of its opposite end faces normal to the body axis and with an angle of inclination thereto, an output light beam is obtained which leaves the other end face of the transmission body in a direction at right angles thereto with an axial deviation corresponding to the angle of inclination of the input light beam to the body axis. Thus, such light-focusing transmission body, having an axial length corresponding to an odd multiple of one quarter of the pitch of beam undulation P, is capable of functioning, between the opposite end faces thereof, to convert any positional deviation of a light beam relative to the body axis into a corresponding angular deviation relative thereto or, inversely, any angular deviation of a light beam into a corresponding positioned deviation. It will be readily recognized, therefore, that by combining such light-focusing transmission body with a diffraction grating or the like wavelength-dependent light dispersing element, an optical system can be realized in which variations in angle between the different-wavelength components of a light beam are convertible into those in radial position on one end face of the transmission body. With such system, it will be readily understood that the light beam components of different wavelengths can be efficiently coupled to respective separate optical fibers simply by properly arranging the latter on that end face of the transmission body.

The present invention will next be described with reference to the accompanying drawings, which illustrate a few preferred embodiments of the present invention.

DESCRIPTION OF THE PREFERRED EMBODIMENTS

Figure 1:
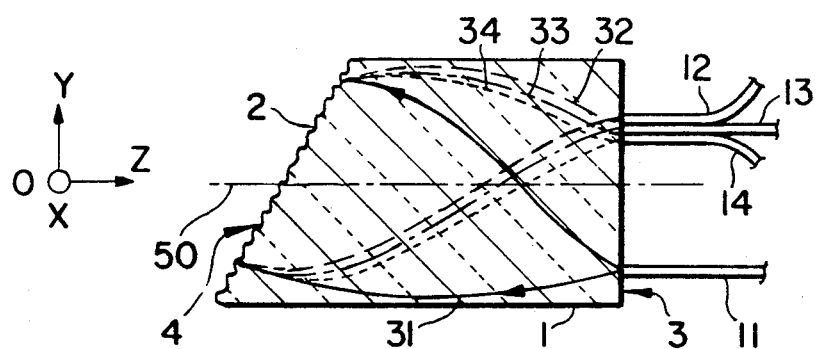
FIG. 1 is a longitudinal axial cross section of a first embodiment of the present invention.
Figure 2:
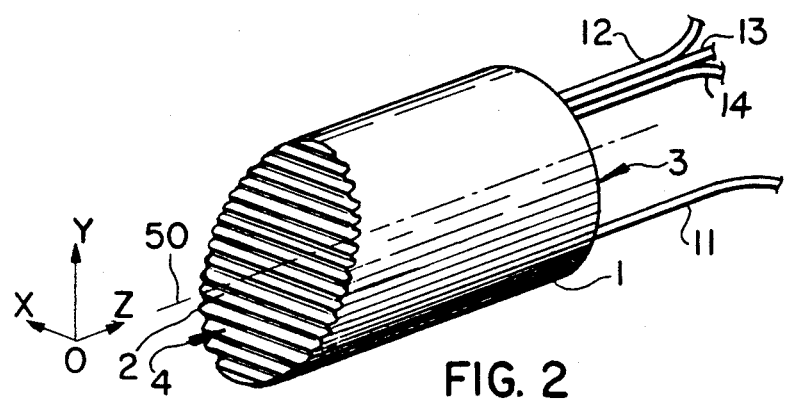
FIG. 2 is an oblique view of same.

Description will first be made of the first embodiment of the present invention with reference to FIGS. 1 and 2, in which coordinate axes x, y and z are taken as illustrated.

Reference numeral 1 generally indicates a light-focusing transmission body in the form of a glass rod of circular cross section having a diameter of approximately 1.8 millimeters and having a refractive index distribution given by well-know ion-exchange techniques so that the refractive index is reduced substantially in proportion to the square of the distance from the axis of the transmission body. One of the opposite end faces, 3, of the transmission body 1 is normal to the axis thereof and an optical fiber 11 is led to the end face 3 at a point spaced 0.66 mm. from the center thereof and lying on a line which extends parallel to the y-axis along the end face and intersects the axis 50 of the transmission body 1. Further optical fibers 12, 13 and 14 are led to the end face 3 at respective points on the diametral line which are oppositely spaced from the face center by respective distances of 0.33 mm., 0.43 mm. and 0.53 mm. The other end face 4 of the light-focusing transmission body 1 is inclined to the axis thereof at an angle of 60° and on which end face 4 is formed a reflection diffraction grating 2 by the process of coating a photo-resist material on the end face 4, exposing to light the coated end face by utilizing an interference pattern of a laser beam, forming in the end face so treated a large number of parallel grooves spaced from each other by a distance of 0.99 μM and extending parallel to the x-axis by etching, and finally vapor-depositing a film of gold on the grooved end face. In accordance with the refractive index, $N_o$, of the light-focusing transmission body 1 on the axis thereof, which is 1.6, and the focusing parameter a of the transmission body 1, which is 0.11 mm.$^{-2}$, the axial length l of the transmission body 1, which is the distance between the points of intersection of the axis 50 with the opposite end faces 3 and 4 of the transmission body 1, is determined at 4.7 mm., which is approximately equal to one quarter of the pitch of beam undulation P. With this light-focusing transmission body 1, a light beam 31 entering its end face 3 at right angles thereto from the adjacent end of the optical fiber 11, which is radially offset from the axis 50 of the transmission body 1, impinges on the opposite end face 4 thereof at an angle of inclination of approximately 20° to the body axis 50 while diverging toward the end face 4, as illustrated in solid lines in FIG. 1, so that the different-wavelength components of the light beam 31 are reflected by the reflection diffraction grating 2 formed on the end face 4 at respective angles differing from each other. For instance, a beam component of wavelength 0.81 μM is diffracted at an angle of 20° to the axis 50 of the transmission body; and those of wavelengths 0.85 μm and 0.89 μm are diffracted at respective angles of 16° and 13°. The beam components so diffracted travel in opposite direction through the transmission body 1 as respective light beams 32, 33 and 34, which are re-focused under the lens effect of the transmission body 1 and are efficiently directed into the respective optical fibers 12, 13 and 14, arranged on the end face 3 of the transmission body 1. Though, with this device, wavelength division of a composite light beam is efficiently performed as described above, it will be obvious that the same device is also usable as an optical multiplexer and it has actually been ascertained that light beams of respective wavelengths of 0.81 μm., 0.85 μm and 0.89 μm as directed into the transmission body 1 through the respective optical fibers 12, 13 and 14 are all coupled to the optical fiber 11.

According to the present invention, an optical wavelength-division multiplexing and demultiplexing device has been realized which is extremely compact and stable owing to the use of a small-sized light-focusing transmission body as a focusing element. Further, the use of a diffraction grating as a light-dispersing element, which gives an exceedingly high resolving power, has made it possible for the device to operate with an extraordinarily high density of multiplexing.

Figure 3:
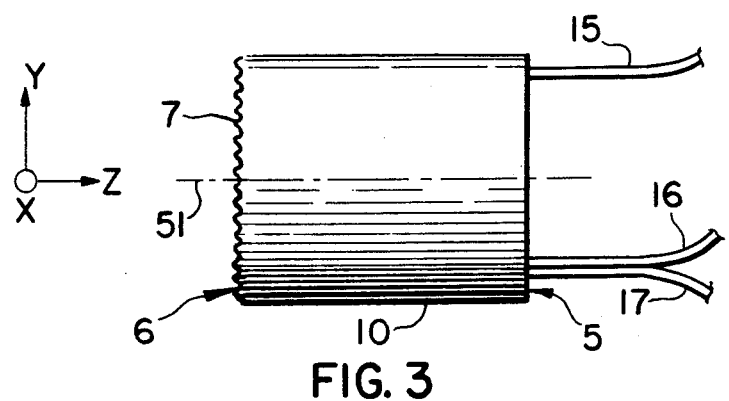
FIG. 3 is a side view of a second embodiment of the present invention.

Description will next be made of a second embodiment of the present invention with reference to FIG. 3. In this embodiment is used a light-focusing transmission body 10 which is substantially similar to the one used in the first embodiment except that it has the opposite end faces 5 and 6 both polished substantially normal to the central axis 51 of the transmission body so as to define an axial length of approximately 4.7 mm. As shown, an optical fiber 15 is led to one of the opposite end faces, 5, of the transmission body 10 at a point spaced 0.8 mm. from the center thereof and lying on a line which extends parallel to the y-axis along the end face 5 and intersects the axis 51 of the transmission body. Further optical fibers 16 and 17 are also led to the end face 5 at respective points on the diametral line which are oppositely spaced from the face center by respective distances of 0.65 mm. and 0.76 mm. A reflection diffraction grating 7 is formed on the other end face 6 of the transmission body 10 by substantially the same procedure as used in the first embodiment. With this second embodiment, it has been ascertained that a composite light beam of wavelengths 0.80 μm and 0.85 μm entering the transmission body 10 through the optical fiber 15 is divisible into beam components as distributed into the optical fibers 16 and 17.

Though, in the embodiments described above, the light-focusing transmission body 1 or 10 has been given an axial length l which corresponds to one quarter of the pitch of beam undulation P, satisfying the formula $\sqrt{a}l=\pi/2$, where a is the focusing parameter, it is to be understood that the axial length has been given only by way of example and quite the same operation can also be realized with any other axial length which corresponds to an odd multiple of ¼P, satisfying the formula, $\sqrt{a}l=\pi/2+m\pi$ (m is an integer), on account of the characteristics of the transmission body.

Further, it is to be clearly noted that substantially the same result is obtainable even if $\sqrt{a}l$ is not exactly equal to $\pi/2$ or $\pi/2+m\pi$ as long as $\sqrt{a}l$ is approximately equal thereto provided that the input-output end face of the transmission body is slightly spaced from the adjacent ends of the optical fibers.

Figure 4:
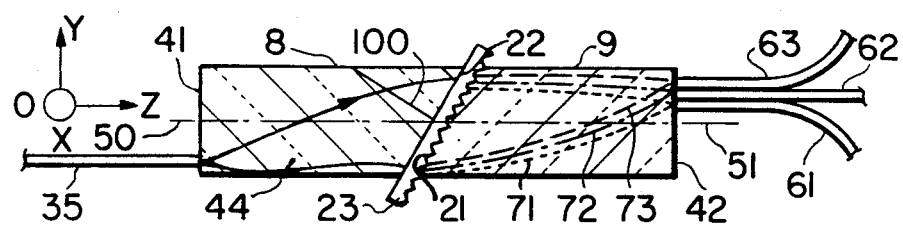
FIG. 4 is a longitudinal axial cross section of a third embodiment of the present invention.
Figure 5:
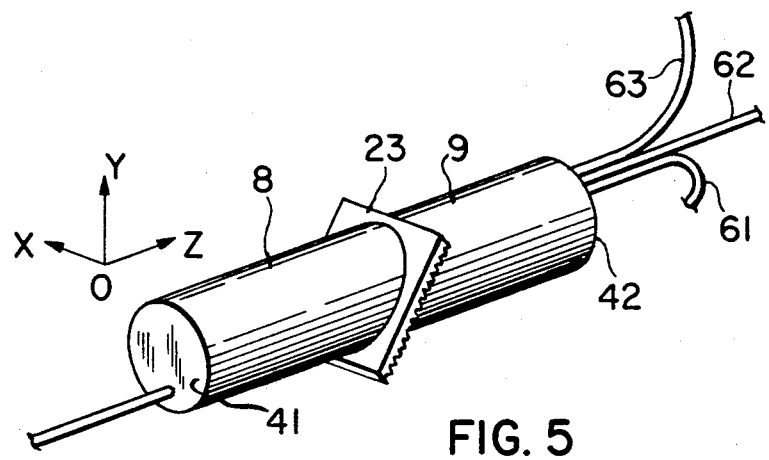
FIG. 5 is an oblique view of same.

A third embodiment of the present invention is illustrated in the cross section of FIG. 4 and the oblique view of FIG. 5. Coordinate axes X, Y and Z are taken as shown. Reference numeral 8 indicates a first light-focusing transmission body in the form of a glass rod of circular cross section of approximately 1.8 mm. diameter and has a refractive index distribution given by well-known ion-exchange techniques so that the index value is gradually reduced radially from the center to the periphery of the transmission body. One of the opposite end faces, 41, of the transmission body 8 is substantially normal to the axis 50 thereof to serve as an input end face. The other end face or output end face 22 of the transmission body 8 is inclined to the axis 50 at an angle of approximately 60°. A transmission type diffraction grating 23 is arranged in close proximity to the output end face 22 of the first light-focusing transmission body 8. Reference numeral 9 indicates a second light-focusing transmission body prepared by substantially the same method as the first transmission body 8. The second transmission body 9 has a central axis 51 substantially aligned with that 50 of the first transmission body 8 and has an input end face 21 inclined to the axis 51 at an angle of approximately 60° and arranged in close proximity to the diffraction grating 23. One end of an optical fiber 35 is brought to the input end face 41 of the first transmission body 8 at a point spaced 0.66 mm. from the center thereof and lying on a line which extends parallel to the Y-axis along the end face and intersects with the axis 50. Three of optical fibers 61, 62 and 63 are arranged at one end on the output end face 42 of second transmission body 9, which is substantially normal to the axis 51 of the transmission body 9, at points spaced 0.33 mm., 0.43 mm. and 0.53 mm., respectively, from the face center and lying on a line which extends parallel to the Y-axis along the end face 42 and intersects the axis 51. The transmission type diffraction grating 23 is a so-called "blazed" diffraction grating made of a transparent acryl resin sheet of approximately 0.5 mm. thickness by the process of coating the sheet with a photoresist material, exposing to light the coated sheet by utilizing an interference pattern of a laser beam, and then forming in the exposed sheet a large number of parallel grooves spaced from each other by a distance of approximately 0.99 $\mu$m by slant ion-beam etching. The first and second light-focusing transmission bodies 8 and 9 have each an axial length of 4.7 mm., as measured between the input and output end faces (41, 22; 21, 42) of the transmission body 8 or 9 along the axis 50 or 51 thereof. This axial length is approximately equal to one quarter of the pitch of undulation P (=18.8 mm.) of a light beam entering the transmission body off-axis thereof. Accordingly, the light beam 44 directed through the optical fiber 35 into the first transmission body 8 forms in the neighborhood of the output end face 22 thereof a parallel beam of maximized diameter which impinges on the transmission type diffraction grating 23 at an angle of inclination of approximately 43° to the normal 100 thereto. At the grating 23, the beam components of different wavelengths are diffracted at different angles corresponding to the respective wavelengths to proceed as a first, a second and a third light beam 71, 72 and 73, respectively. In this embodiment, it has been found that an incident light beam of 0.81 $\mu$m wavelength is diffracted in a direction at an angle of 19° to the axis 50 of the first light-focusing transmission body 8; that of 0.85 $\mu$m wavelength, in a direction at an angle of 16° to the body axis 50; and that of 0.89 $\mu$m wavelength, in a direction at an angle of 13° to the axis 50. The light beams so diffracted have been re-focused by the second light-focusing transmission body 9 so as to be launched through respective optical fibers 61, 62 and 63, arranged on the output end face 42 of the transmission body 9. With this device, it will be obvious that light beams of different wavelengths 0.81 $\mu$m, 0.85 $\mu$m of 0.89 $\mu$m as directed through the respective optical fibers 61, 62 and 63 into the second transmission body 9 can be efficiently coupled to the optical fiber 35 at the opposite end of the device. In other words, the embodiment of FIGS. 4 and 5 can serve as an optical multiplexer as well as an an optical demultiplexer in an efficient manner.

According to this embodiment, it will be readily appreciated that there is realized an optical wavelength-division multiplexing and demultiplexing device which is extremely compact in size, employing a first and a second light-focusing transmission body 8 and 9 both of 1.8 mm. diameter and 4.7 mm axial length and in which the small-sized transmission bodies 8 and 9 are fixed together with a transmission diffraction grating 23 interposed therebetween to form a highly stable optical circuit. As with the case of the embodiments previously described, this form of optical multiplexing and demultiplexing device is capable of an extraordinarily high density of multiplexing.

Figure 6:
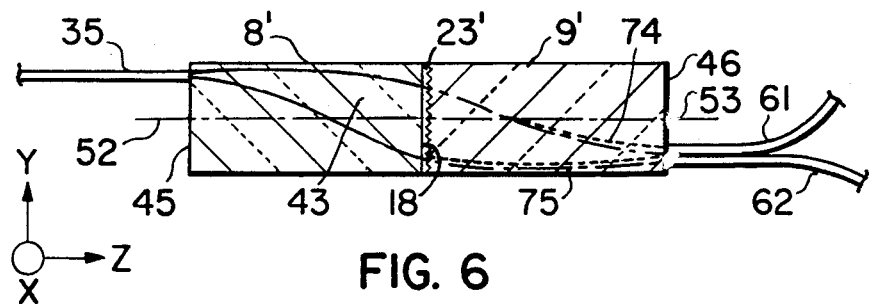
FIG. 6 is a view similar to FIG. 4, illustrating a fourth embodiment of the present invention.

FIG. 6 illustrates a fourth embodiment of the present invention in cross section. This embodiment includes a first and a second light-focusing transmission body 8' and 9' substantially similar in nature to those used in the third embodiment and each having an axial length of approximately 4.7 mm. The first light-focusing transmission body 8' has opposite end faces 45 and 18 polished substantially at right angles to the axis 52 and is formed directly on the output end face 18 with a transmission type diffraction grating 23' including parallel grooves spaced 0.96 $\mu$m from each other. The second light-focusing transmission body 9' is arranged coaxially with the first light-focusing transmission body 8' in close proximity to the transmission type diffraction grating 23'. An input optical fiber 35 is arranged at one end on the input end face 45 of first light-focusing transmission body 8' at a point spaced 0.8 mm. from the face center and lying on a line which extends parallel to the Y-axis along the end face, intersecting the axis 52 of the transmission body 8'. Similarly, a first and a second output optical fiber 61 and 62 are arranged at one end on the output end face 46 of second light-focusing transmission body 9' at points respectively spaced 0.65 mm. and 0.76 mm. from the face center and lying on a line which extends parallel to the Y-axis along the end face, intersecting the axis 53 of the transmission body 9'. In this embodiment, though the transmission type diffraction grating 23' is not inclined to the axis 52, the input light beam 43 directed through the input optical fiber 35, which is arranged off-axis, impinges on the diffraction grating 23' at an angle of inclination thereto, taking an undulatory path through the first light-focusing transmission body 8'. Again with this embodiment, it has been ascertained that the components of input light beam 43, of wavelengths 0.80 $\mu$m and 0.85 $\mu$m, are efficiently distributed into the first and second output optical fibers 61 and 62.

Though, in the third and fourth embodiments, the axial length of the first and second light-focusing transmission bodies 8, 8', 9 and 9' has been so selected as to be approximately equal to one quarter of the pitch of undulation P of an off-axis input light beam, it is to be understood that the length value has only given by way of example and the transmission bodies may have any other axial length which corresponds to ¼ plus half a multiple of the pitch of beam undulation, in view of the characteristics of the transmission bodies. In addition, in cases where the optical fibers are arranged slightly apart from the input and output end faces of the device, substantially the same satisfactory result is obtainable even with the axial length slightly less than that given in the manner described above.

Though a number of preferred embodiments of the present invention have been shown and described, it is to be understood that various changes and modifications may be made therein without departing from the spirit of the invention or from the scope of the appended claims. For example, though, in the embodiments illustrated, a blazed type diffraction grating having parallel grooves has been employed, if may be substituted for by a so-called volume hologram which has a periodically varying refractive index distribution. Also, though, in the embodiments illustrated, optical fibers have been directly connected to a light-focusing transmission body in abutting relation thereto, a coupling circuit including a collecting element may be employed between the optical fibers and transmission body for connection therebetween. It will be obvious that the optical fibers may be made detachable from the transmission body with use of a connector or the like means.

Further, in the embodiments illustrated, a plurality of optical fibers are connected to the output end face of the light-focusing transmission body so that the individual wavelength components of a light beam may be coupled through the respective optical fibers to photodetector means so that light rays from a light source may be coupled to an optical multiplexer circuit. Use of such optical fibers, however, is not always needed and may be replaced, for example, by an array of optical detector elements arranged adjacent to the output end face of the device to directly receive the output light beams.

Also, it will be apparent that, in any of the embodiments illustrated, the diffraction grating used therein may be formed directly on the end face of the light-focusing transmission body by processing the end face per se irrespective of whether it is arranged on one end face of the device or midway thereof between two aligned light-focusing transmission bodies.

What is claimed is:

1. An optical wavelength-division multiplexing and demultiplexing device characterized by comprising: a light-focusing transmission body having a refractive index graded to decrease in a cross section normal to the axis of said transmission body radially from the center to the periphery thereof and having an axial length approximately equal to a multiple of one quarter of the pitch of undulation of a light beam travelling through said transmission body; and diffraction grating means formed on the axis of said transmission body at a distance approximately equal to an odd multiple of one quarter of the pitch of beam undulation from one end face of said transmission body which is normal to the axis thereof.

2. An optical wavelength-division multiplexing and demultiplexing device as set forth in claim 1, in which the axial length of said light-focusing transmission body is approximately equal to one quarter of the pitch of beam undulation and said diffraction grating is of the reflection type, being formed on the other end face of said transmission body.

3. An optical wavelength-division multiplexing and demultiplexing device as set forth in claim 2, further comprising a plurality of optical fibers led to said one end face of said light-focusing transmission body at respective predetermined distances from the axis thereof so that a light beam including different-wavelength components and directed through at least one of said optical fibers into said transmission body is coupled to the other optical fibers each for one wavelength component.

4. An optical wavelength-division multiplexing and demultiplexing device as set forth in claim 3, in which said diffraction grating of the reflection type is arranged at an angle to the axis of said light-focusing transmission body.

5. An optical wavelength-division multiplexing and demultiplexing device as set forth in claim 3, in which said diffraction grating of the reflection type is arranged normal to the axis of said light-focusing transmission body.

6. A method of making an optical wavelength-division multiplexing and demultiplexing device characterized in that it comprises the steps of: preparing a first and a second light-focusing transmission body each having a refractive index graded to decrease in a cross section normal to the axis of the light-focusing transmission body radially from the center to the periphery thereof and having an axial length approximately equal to an odd multiple of the pitch of undulation of a light beam travelling through the light-focusing transmission body, forming a transmission type diffraction grating on one end face of the first light-focusing transmission body, and arranging the second light-focusing transmission body in aligned relation to the first light-focusing transmission body with the transmission type diffraction grating interposed between the first and second light-focusing transmission bodies.

* * * * *

UNITED STATES PATENT AND TRADEMARK OFFICE
CERTIFICATE OF CORRECTION

PATENT NO. : 4,198,117
DATED : April 15, 1980
INVENTOR(S) : Kohroh Kobayashi

It is certified that error appears in the above—identified patent and that said Letters Patent is hereby corrected as shown below:

On the title page, Item [73], "Nippon Electric Co., Ltd.," should read: --- Nippon Selfoc Company, Limited ---.

Signed and Sealed this

Twelfth Day of August 1980

[SEAL]

Attest:

SIDNEY A. DIAMOND

Attesting Officer     Commissioner of Patents and Trademarks